United States Patent [19]
Burckhardt et al.

[11] 3,802,529
[45] Apr. 9, 1974

[54] DEVICE FOR PREVENTING THE SPINNING OF THE DRIVEN WHEEL OF A VEHICLE

[75] Inventors: Manfred H. Burckhardt, Waiblingen; Hans-Jörg Florus, Goppingen; Horst Grossner, Geradstetten; Hellmut Krohn, Esslingen; Hermann Stein, Stuttgart, all of Germany

[73] Assignee: Daimler-Benz Aktiengesellschaft, Stuttgart-Unterturkheim, Germany

[22] Filed: Sept. 27, 1972

[21] Appl. No.: 292,795

[30] Foreign Application Priority Data
Sept. 28, 1971 Germany............................ 2148302

[52] U.S. Cl............ 180/82 R, 180/105, 303/21 EB
[51] Int. Cl............................................ B60k 27/00
[58] Field of Search ................... 303/21 EB, 21 CG; 180/82 R, 105, 100, 54, 64

[56] References Cited
UNITED STATES PATENTS
3,288,232  11/1966  Shepherd.................... 303/21 EB X
3,680,655  8/1972  Beterlein:.................. 303/21 EB UX
3,260,555  7/1966  Packer........................... 303/21 EB
3,520,575  7/1970  Steigerwald.................... 303/21 BE
3,503,654  3/1970  Stamm........................... 303/21 EB Primary Examiner—Richard A. Schacher
Assistant Examiner—Gene A. Church
Attorney, Agent, or Firm—Craig and Antonelli

[57] ABSTRACT

A system for preventing the spinning of the driven wheels of a vehicle, especially of a motor vehicle in which a generator is provided producing an electrical voltage proportional to the wheel rotational speed of the associated wheel; a difference-forming element is connected to the generators of a respective vehicle side which supplies an electrical voltage proportional to the wheel rotational speed difference of a driven and non-driven wheel, this signal being applied either in an analog or digital manner to an actuating element decreasing the engine torque and/or to the actuating elements influencing the brakes of the driven wheels.

24 Claims, 5 Drawing Figures

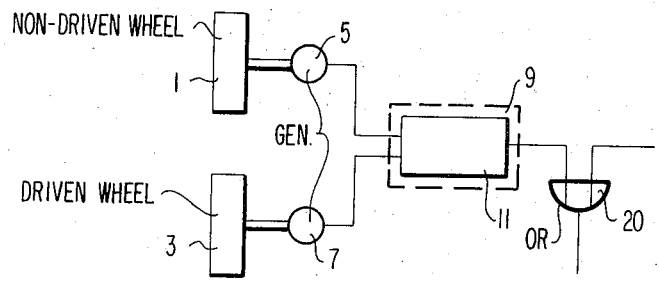
FIG. 1a
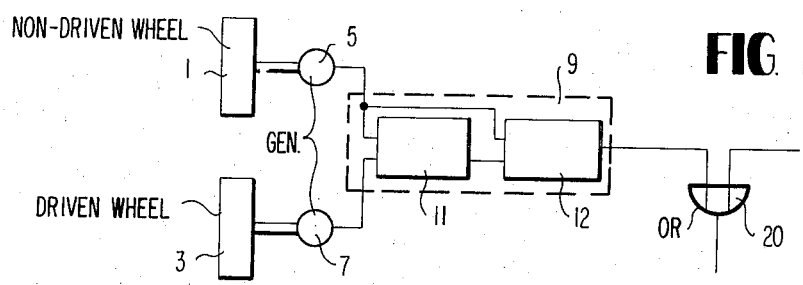
FIG. 1b
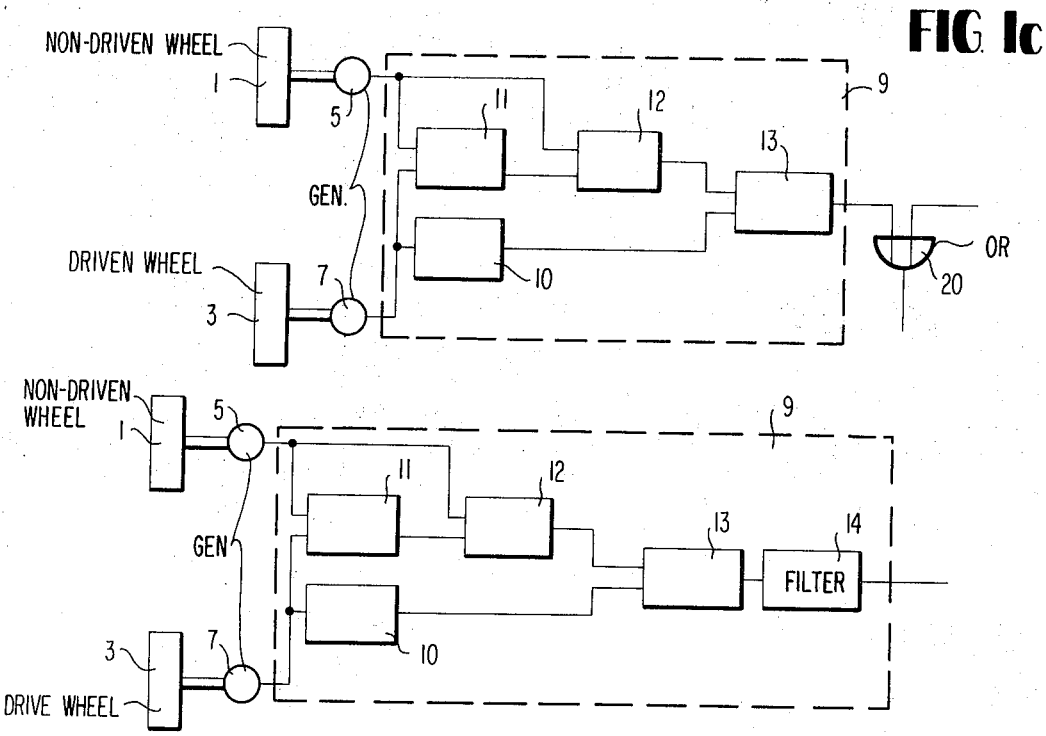
FIG. 1c
FIG. 2

DEVICE FOR PREVENTING THE SPINNING OF THE DRIVEN WHEEL OF A VEHICLE

The present invention relates to an installation for the prevention of the spinning of the driven wheels of a vehicle, especially of a motor vehicle, in which each wheel is provided with a generator supplying an electrical voltage proportional to the wheel rotational speed.

Installations are already known in the prior art which, starting with the rotational speed acceleration of a driven wheel or of the cardan shaft or also with the slippage between driven and non-driven wheels, prevent the spinning of the driven wheels.

An installation which starts exclusively from the rotational speed acceleration of a driven wheel or of the cardan shaft, entails the significant disadvantage that it does not take into consideration the tractional friction between the wheel and the road surface whereas a system controlling for a constant slippage value permits only an inadequate acceleration during starting and thus also exhibits shortcomings.

The present invention is concerned with the task to provide a system which does not exhibit the aforementioned drawbacks and shortcomings and which permits an optimum acceleration during the starting without going prematurely into action and which enables in particular an analog control.

The underlying problems are solved according to the present invention in that a difference-forming logic element is present which produces an electrical voltage proportional to the rotational speed difference of a driven and of a non-driven wheel and in that this signal acts either in an analog or in a digital manner on an actuating element decreasing the engine torque and/or on further actuating members influencing the brakes of the driven wheels.

Particularly in the starting range where the slippage may temporarily amount to 100 percent, it is appropriate to base the control on a rotational speed difference between driven and non-driven wheels. With a corresponding selection of this rotational speed difference, an optimum acceleration is made possible during the starting without causing the control system to respond within this operating range.

Since a predetermined rotational speed difference corresponds to a permissive slippage that becomes ever smaller with increasing vehicle velocity and since based on actual experience an optimum torque is transmitted with a slippage of about 15 percent, excepting in the starting range, it is of advantage to interconnect a predetermined rotational speed difference with the vehicle velocity in such a manner that in the starting range the control takes place according to the rotational speed difference which, with a further velocity increase, is replaced by a logic connection, approximating the respective optimum slippage, of rotational speed difference of a driven and of a non-driven wheel and of vehicle velocity.

This can be obtained according to the present invention in that a logic element is connected to the element forming the difference, to which is fed, on the one hand, the electrical voltage proportional to the rotational speed difference and, on the other, the electrical voltage proportional to the wheel rotational speed of the non-driven wheel—and thus of the vehicle velocity—and whose output supplies an electrical voltage corresponding to the logic connection of these two voltages which acts on the actuating elements.

A still more effective and more comfortable control can be attained in that, in addition to the rotational speed difference depending on velocity, also the rotational speed acceleration of the driven wheels is detected and evaluated.

Advantageously, this combination works out in such a manner that a control starts already during the tendency for spinning and thus a more rapid interaction on the engine torque and/or the brakes can take place, which entails a considerable comfort improvement.

This combination can be realized according to the present invention in that differentiating elements are connected to the generators associated with the driven wheels which produce an electric voltage proportional to the wheel acceleration, which is interconnected in a logic element with the electric voltage proportional to the wheel rotational speed difference or to the wheel rotational speed difference logically connected with the rotational speed of the driven wheel, and in that the analog output voltage of the logic element acts on the actuating members.

Since the drive connection from engine to the tires represents a spring-mass system, it is appropriate to counter-act the occurrence of vibrations or oscillations.

This is realized according to the present invention in that a phase-and amplitude-correcting filter element is provided, by way of which is conducted the voltage acting on the actuating elements.

The system will be described by reference to one embodiment of the present invention. A motor vehicle with electronic fuel injection is thereby provided in which an analog control of the torque can be realized in a particularly simple manner.

The installation is thereby to have such a construction that the electrical voltages proportional to the rotational speed of the driven and non-driven wheel are adapted to be logically combined into analog voltages acting on the actuating elements separately for the left and right vehicle side.

According to the present invention, the analog voltages determined separately for the left and the right vehicle side are thereby to act on the actuating element decreasing the engine torque as an analog signal and on the actuating elements influencing the brakes of the driven wheels as digital signals.

The analog-digital conversion of the analog voltages may thereby take place in that comparators are provided which compare the analog voltages with an adjustable, predetermined intended or desired value and produce a digital signal upon exceeding the same.

According to the present invention, NAND-elements are provided and are so connected that they transmit a digital signal to the actuating element of the brake coordinated to their vehicle side only, if only the comparator coordinated also to this vehicle side produces an output signal.

For obtaining a single analog signal from the analog voltages, an analog OR-element is provided, to the inputs of which are fed the analog voltages determined separately for each vehicle side and whose analog output voltage corresponds to one of the largest input voltages.

By means of the comparators for obtaining the digital signals, one can simultaneously determine a threshold below which the control is not to interact, i.e., not to become operable.

This can be realized by the presence of a digitally controlled analog switch of conventional construction which permits the passage of the analog voltage coming from the analog OR-element to the actuating element decreasing the engine torque only when simultaneously a digital signal is present at its two other inputs which are connected with the outputs of the comparators.

Accordingly, it is an object of the present invention to provide an installation for preventing the spinning of the driven wheels of a vehicle, particularly of a motor vehicle which avoids by simple means the aforementioned shortcomings and drawbacks encountered in the prior art.

Another object of the present invention resides in a system for preventing the spinning of the driven wheels of a motor vehicle which takes into consideration the tractional friction between wheel and road surface and also permits an adequate acceleration during starting of the vehicle.

A further object of the present invention resides in a system of the aforementioned type which not only permits an optimum acceleration but also makes possible an analog control thereof.

A still further object of the present invention resides in a control system for preventing the spinning of the driven wheels of a motor vehicle which is relatively simple in construction yet is effective in operation and assures a comfortable control.

Another object of the present invention is an installation for preventing the spinning of the driven wheels of motor vehicles which responds already in the presence of a tendency to spin and thus assures a fast interaction on the engine torque and/or the brakes of the vehicle.

These and further objects, features and advantages of the present invention will become more apparent from the following description when taken in connection with the accompanying drawing which shows, for purposes of illustration only, several embodiments in accordance with the present invention, and wherein:

FIG. 1a is a schematic diagram of a system for preventing the spinning of the driven wheels of a vehicle in accordance with the present invention which controls according to the rotational speed difference;

FIG. 1b is a schematic diagram of a system for preventing the spinning of the driven wheels of a vehicle in accordance with the present invention, which controls according to the velocity-dependent rotational speed difference;

FIG. 1c is a schematic diagram of a system for preventing the spinning of the driven wheels of a vehicle in accordance with the present invention, controlling according to the logic connection or combination of the velocity-dependent rotational speed difference with the wheel acceleration;

FIG. 2 is a schematic diagram of a system according to FIG. 1c with a filter element in accordance with the present invention.

Figure 3:
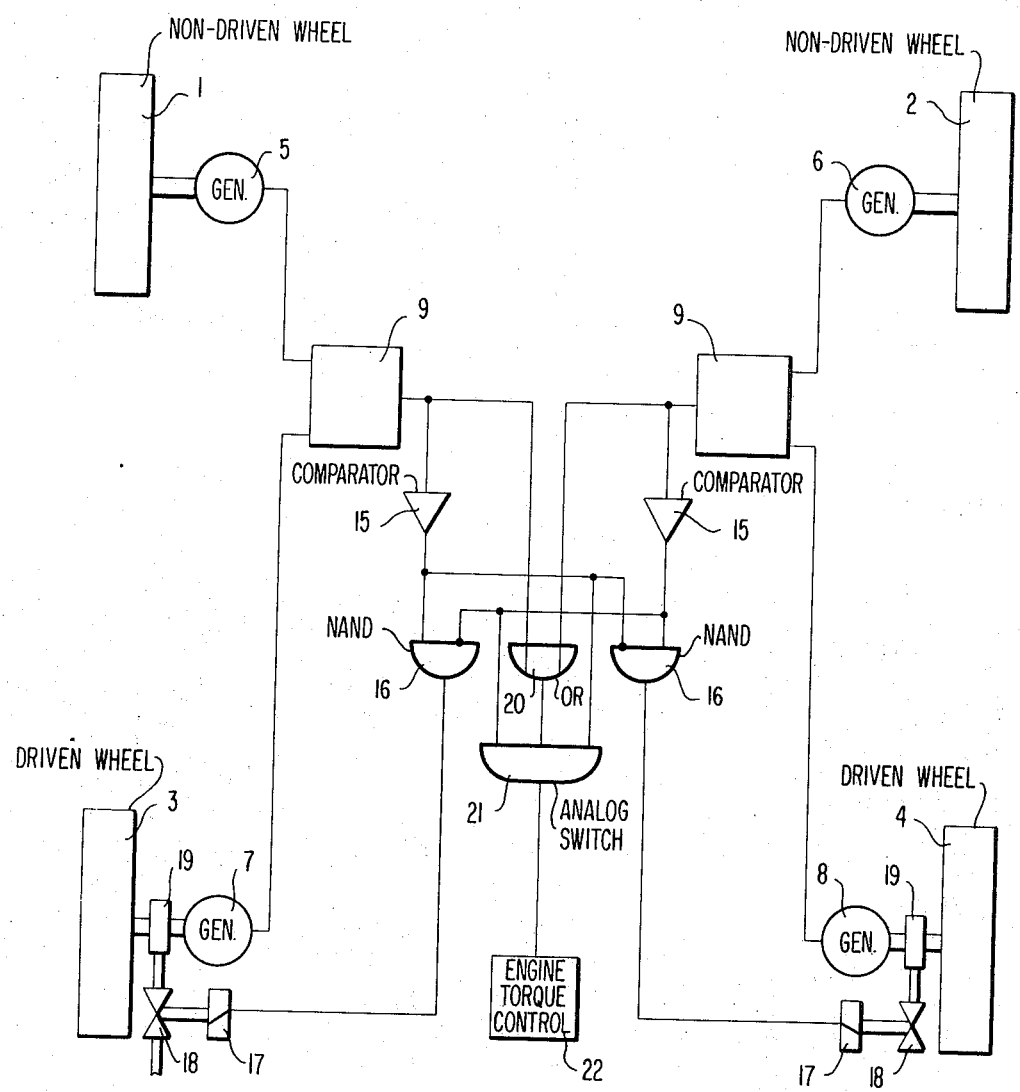
FIG. 3 is one embodiment of an entire system for a vehicle according to FIG. 2.

Referring now to the drawing wherein like reference numerals are used throughout the various views to designate like parts, and more particularly to FIGS. 1a, 1b and 1c, there is illustrated in these figures respectively for one vehicle side, the part 9 of the system in which is carried out the processing of the voltages proportional to rotational speed into an analog output voltage.

The generators 5 and 7 coordinated to the non-driven wheel 1 and the driven wheel 3 supply voltages proportional to the rotational speeds of these wheels. These voltages are fed to the part 9 of the system.

This part 9 consists in FIG. 1a only of a conventional difference-forming element forming the difference between the two voltages, in FIG. 1b of the element 11 forming the differences and of a logic element 12 in which are combined the voltages proportional to the rotational speed difference and the vehicle velocity and in FIG. 1c of these so far described logic elements 11 and 12 as well as of a differentiating element 10 in which a voltage is produced proportional to the rotational speed acceleration of the driven wheel and is combined with the voltage proportional to the velocity-dependent rotational speed difference in a logic element 13.

The analog voltages coming from the elements 9 of both vehicle sides are respectively combined into an output voltage by way of an OR-element 20 and are further transmitted to the actuating elements (not shown in FIGS. 1a, 1b and 1c).

FIG. 2 illustrates the part 9—again for only one vehicle side—as it is used in the embodiment according to FIG. 3.

The generator 5 coordinated to the non-driven wheel 1 is connected with the difference-forming element 11 forming the voltage difference and with the logic element 12 while the generator 7 coordinated to the driven wheel 3 is also connected with the difference-forming element 11 and the differentiating element 10. The output of the difference-forming element 11 is connected with the second input of the logic element 12 whose output as well as the output of the differentiating element 10 are fed to the inputs of the logic element 13. The output of the logic element 13 is connected with the input of the filter element 14, at the output of which is available the analog output voltage for further processing.

The generators 5 and 7 coordinated to the wheels 1 and 3 supply electrical voltages proportional to the rotational speeds of the driven wheel 3 and of the non-driven wheel 1, from which a voltage is formed in the difference-forming element 11 which is proportional to the rotational speed difference of the two wheels. This voltage is so connected and combined in the logic element 12 with the voltage proportional to the rotational speed of the non-driven wheel or of the vehicle velocity that an analog voltage is produced in the output of the logic element 12 whose progress or development is approximated to the voltage proportional to the rotational speed difference in the starting and lower velocity range and to a voltage corresponding to the slippage between driven and non-driven wheel in the middle and upper velocity range. In order to constitute the control still more effective and more comfortable, a voltage proportional to the acceleration of the driven wheel 3 is obtained from the voltage proportional to the rotational speed of the driven wheel 3; this voltage proportional to the acceleration is connected and combined in the logic element 13 with the analog voltage at the output of the logic element 12. It is achieved thereby that the control becomes effective already during the tendency for spinning and prevents a larger control cycle which becomes noticeable again in a comfort-increasing manner.

In order to prevent the occurrence or generation of vibrations or oscillations, a phase-correcting and amplitude-correcting filter element 14 is connected in the output of the logic element 13; the analog voltage for further processing is then available in the output of the filter element 14.

FIG. 3 illustrates one embodiment of the present invention in schematic diagram form.

The generators 5 to 8 coordinated to the driven and non-driven wheels 1 to 4 produce voltages proportional to the wheel rotational speeds which are fed respectively to a part 9 described in connection with FIG. 2 separately for the left and right vehicle side, at the output of which is available an analog voltage. This analog voltage is fed to a comparator 15 coordinated to this vehicle side as well as to an analog OR-element 20 which interconnects and combines the analog voltages separately produced for both vehicle sides into a single analog signal.

The present invention provides that the actuating element 22 decreasing the engine torque, which may be of any conventional construction as known, for example, in connection with electronic fuel injection systems, is controlled by analog signals whereas the actuating elements 17 coordinated to the brakes are controlled by digital signals.

The analog signals are compared in the comparators 15 with predetermined voltage thresholds whereby a digital signal is produced in the output thereof upon exceeding the voltage thresholds.

The output of each comparator 15 is connected with both NAND-elements 16. A signal appears in the output of a NAND-element 16 if only the comparator 15 coordinated to the same vehicle side transmits a signal. The output of a NAND-element is fed to the corresponding actuating element 17 of the brake of the driven wheel 3 or 4 indicated by a valve 18 and a brake drum 19.

According to the present invention, also several switching thresholds may be present in order to enable a suitable brake control whereby also an analog control is feasible within the scope of the present invention.

If the switching thresholds are exceeded simultaneously on both vehicle sides, then both NAND-elements 16 are blocked by the digital output signals of the comparators 15 and the digitally controlled analog switch 21 is opened by the same signals, which permits the passage to the actuating element 22 of the analog signal occurring in the output of the analog OR-element 20, whereby the actuating element 22 acts, for example, on the electronic fuel supply in a decreasing manner.

Since the various generators, difference-forming elements and logic elements as well as the analog switch 21 are of known construction involving commercially available components, which form no part of the present invention, a detailed description thereof is dispensed with herein.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for preventing the spinning of driven wheels of a vehicle, in which each wheel includes a generator means producing an electrical voltage proportional to the respective wheel rotational speed, characterized in that the installation includes a difference-forming means which produces an electrical voltage proportional to the rotational speed difference of a driven and of a non-driven wheel, and connecting means operable to feed the signal represented by the last-mentioned electrical voltage to at least one of several actuating means operable to decrease the engine torque and influence brake means of the driven wheels.

2. An installation according to claim 1, characterized in that the signal is fed to the actuating means decreasing the engine torque as well as to the actuating means influencing the brakes.

3. An installation according to claim 2, characterized in that said signal acts on said actuating means in an analog manner.

4. An installation according to claim 2, characterized in that said signal acts on the actuating means in a digital manner.

5. An installation according to claim 2, characterized in that the wheels are the wheels of a motor vehicle having an internal combustion engine with electronic fuel injection.

6. An installation according to claim 1, characterized in that a logic element is connected to the difference-forming means, said logic element having several inputs and an output, the electrical voltage proportional to the rotational speed difference being fed to one of the inputs and the electrical voltage proportional to the rotational speed of the corresponding non-driven wheel being fed to the other input, and an electrical voltage corresponding to the combination of the voltages at the two inputs being supplied at the output of the logic element, which acts on the actuating means.

7. An installation according to claim 6, characterized in that differentiating means are connected to the generator means coordinated to the driven wheels, which produce an electrical voltage proportional to wheel acceleration, said last-mentioned electrical voltage being combined in a logic element with an electrical voltage proportional to one of rotational speed difference and rotational speed difference logically combined with rotational speed of the non-driven wheel, said last-mentioned logic element producing in its output an analog output voltage acting on the actuating means.

8. An installation according to claim 7, characterized in that a phase-correcting and amplitude-correcting filter means is provided by way of which are fed the voltages acting on the actuating means.

9. An installation according to claim 8, characterized in that the electrical voltages proportional to the driven and non-driven wheel are adapted to be logically combined into analog voltages acting on the actuating means separately for the left and right vehicle side.

10. An installation according to claim 9, characterized in that the analog voltages determined separately for the left and right vehicle side act on the actuating means decreasing the engine torque as analog signal and on the actuating means influencing the brakes of the driven wheel as digital signals.

11. An installation according to claim 10, characterized in that comparator means are provided which compare the analog voltages with an adjustable predetermined desired value and which produce a digital signal upon exceeding said desired value.

12. An installation according to claim 11, characterized in that the connecting means include NAND-elements so interconnected that they transmit a digital signal to the actuating means of the brake of the driven wheel coordinated to the respective vehicle side only if exclusively the comparator means coordinated also to this vehicle side produces an output signal.

13. An installation according to claim 12, characterized in that an analog OR-element is provided having several inputs and an output, the analog voltages separately determined for each vehicle side being fed to the inputs thereof and an analog output voltage being present in its output which correspond to a logic combination of the two input voltages.

14. An installation according to claim 13, characterized by a digitally controlled analog switch means which transmits the analog voltage coming from the analog OR-element to the actuating means decreasing the engine torque only if a digital signal is simultaneously present at its two other inputs which are connected with the outputs of the comparator means.

15. An installation according to claim 14, characterized in that the signal is fed to the actuating means decreasing the engine torque as well as to the actuating means influencing the brakes.

16. An installation according to claim 1, characterized in that differentiating means are connected to the generator means coordinated to the driven wheels, which produce an electrical voltage proportional to wheel acceleration, said last-mentioned electrical voltage being combined in a logic element with an electrical voltage proportional to one of rotational speed difference and rotational speed difference logically combined with rotational speed of the non-driven wheel, said last-mentioned logic element producing in its output an analog output voltage acting on the actuating means.

17. An installation according to claim 1, characterized in that a phase-correcting and amplitude-correcting filter means is provided by way of which are fed the voltages acting on the actuating means.

18. An installation according to claim 1, characterized in that the electrical voltages proportional to the driven and non-driven wheel are adapted to be logically combined into analog voltages acting on the actuating means separately for the left and right vehicle side.

19. An installation according to claim 18, characterized in that the analog voltages determined separately for the left and right vehicle side act on the actuating means decreasing the engine torque as analog signal and on the actuating means influencing the brakes of the driven wheel as digital signals.

20. An installation according to claim 18, characterized in that comparator means are provided which compare the analog voltages with an adjustable predetermined desired value and which produce a digital signal upon exceeding said desired value.

21. An installation according to claim 1, characterized in that the connecting means include NAND-elements so interconnected that they transmit a digital signal to the actuating means of the brake of the driven wheel coordinated to the respective vehicle side only if exclusively the comparator means coordinated also to this vehicle side produces an output signal.

22. An installation according to claim 18, characterized in that an analog OR-element is provided having several inputs and an output, the analog voltages separately determined for each vehicle side being fed to the inputs thereof and an analog output voltage being present in its output which correspond to a logic combination of the two input voltages.

23. An installation according to claim 22, characterized by a digitally controlled analog switch means which transmits the analog voltage coming from the analog OR-element to the actuating means decreasing the engine torque only if a digital signal is simultaneously present at its two other inputs which are connected with the outputs of the comparator means.

24. An installation according to claim 23, characterized in that an analog OR-element is provided having several inputs and an output, the analog voltages separately determined for each vehicle side being fed to the inputs thereof and an analog output voltage being present in its output which correspond to a logic combination of the two input voltages.

* * * * *